(12) United States Patent
Skaf

(10) Patent No.: US 9,416,765 B2
(45) Date of Patent: Aug. 16, 2016

(54) APPARATUS FOR CONVERTING WAVE MOTION ON A BODY OF WATER INTO ELECTRICAL POWER

(71) Applicant: Robert Georges Skaf, Thunder Bay (CA)

(72) Inventor: Robert Georges Skaf, Thunder Bay (CA)

( * ) Notice: Subject to any disclaimer, the term of this patent is extended or adjusted under 35 U.S.C. 154(b) by 141 days.

(21) Appl. No.: 14/465,899

(22) Filed: Aug. 22, 2014

(65) Prior Publication Data

US 2015/0096292 A1    Apr. 9, 2015

(30) Foreign Application Priority Data

Oct. 4, 2013  (CA) ..................................... 2829362

(51) Int. Cl.
| | |
|---|---|
| *F03B 13/14* | (2006.01) |
| *F03B 13/18* | (2006.01) |
| *F03B 13/20* | (2006.01) |
| *F03B 13/10* | (2006.01) |

(52) U.S. Cl.
CPC ............... *F03B 13/14* (2013.01); *F03B 13/10* (2013.01); *F03B 13/185* (2013.01); *F03B 13/20* (2013.01); *F05B 2240/40* (2013.01); *F05B 2260/4022* (2013.01); *Y02E 10/38* (2013.01)

(58) Field of Classification Search
CPC ........ F03B 13/12; F03B 13/14; F03B 13/185; F03B 13/20; F05B 2260/4022; Y02E 10/38
See application file for complete search history.

(56) References Cited

U.S. PATENT DOCUMENTS

| | | | |
|---|---|---|---|
| 8,823,196 B1 * | 9/2014 | Gehring | F03B 13/1885 290/42 |
| 2010/0230965 A1 * | 9/2010 | Pitre | F03B 13/186 290/42 |
| 2010/0283249 A1 | 11/2010 | Harden | |
| 2011/0057448 A1 | 3/2011 | Page | |
| 2012/0117960 A1 * | 5/2012 | Browne | F03B 13/183 60/495 |

FOREIGN PATENT DOCUMENTS

| | | | |
|---|---|---|---|
| JP | 2012237300 A | | 6/2012 |
| JP | 2012237300 A | * | 12/2012 |

OTHER PUBLICATIONS

Page 16 of Discover Magazine, Jul./Aug. 2014 Discloses Groups of Energy—Generating Bouys (p. 16 attached).

* cited by examiner

*Primary Examiner* — Audrey K Bradley
(74) *Attorney, Agent, or Firm* — Ted Masters

(57) ABSTRACT

Apparatus for converting wave motion on a body of water into electrical power includes an electrical power generating system. The system includes a floatable housing. An electrical power generating unit is disposed within the floatable housing. The electrical power generating unit includes two spaced apart wheels which are connected by a drive element, and at least one generator for generating electrical power. A weight is connected to the drive element. When the system is tilted by wave motion, the weight moves toward the lower wheel, thereby turning the wheels and generator(s) and creating electrical power. In an embodiment, a plurality of systems are connected by connectors to form a power generating array.

2 Claims, 9 Drawing Sheets

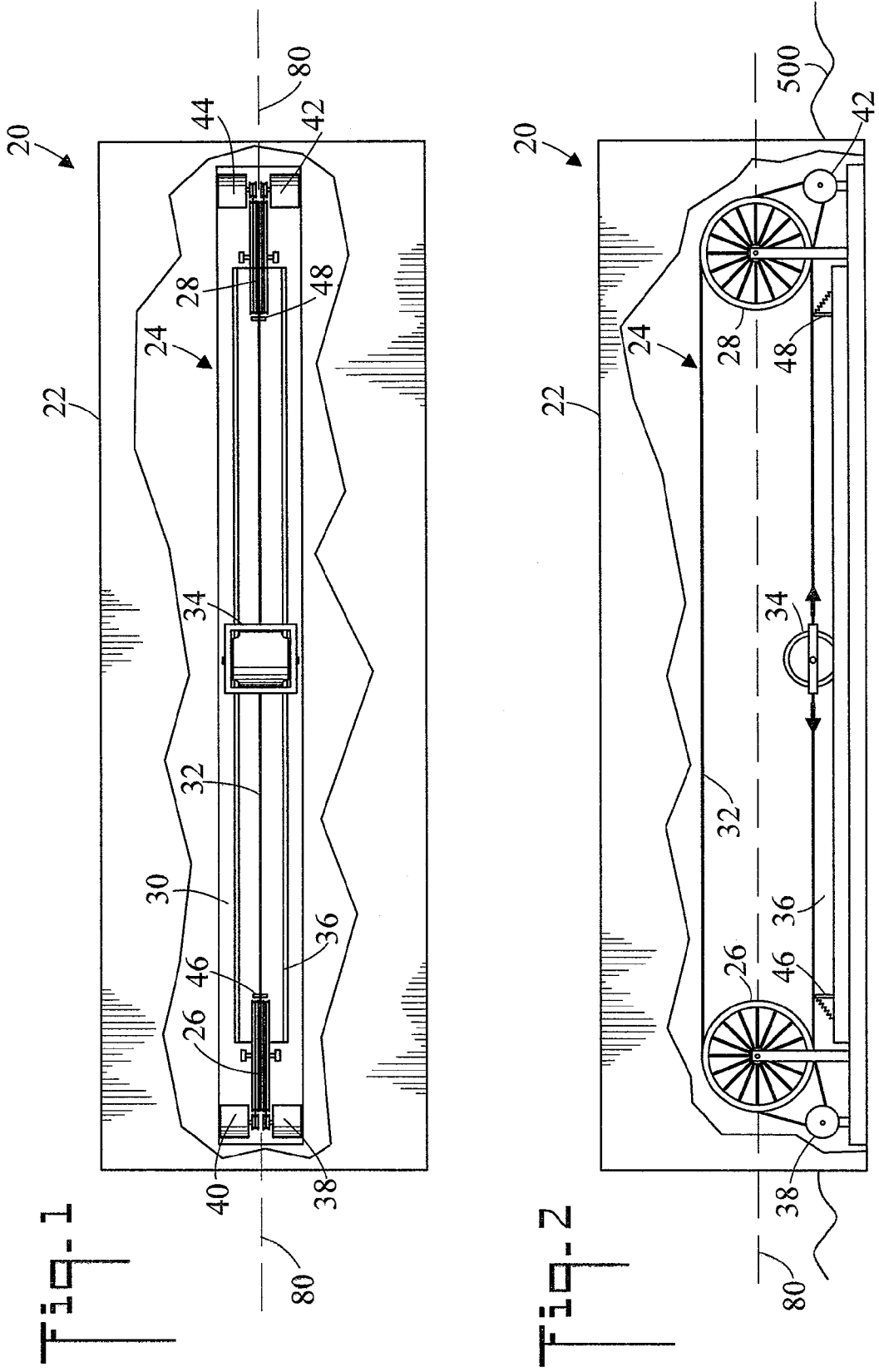

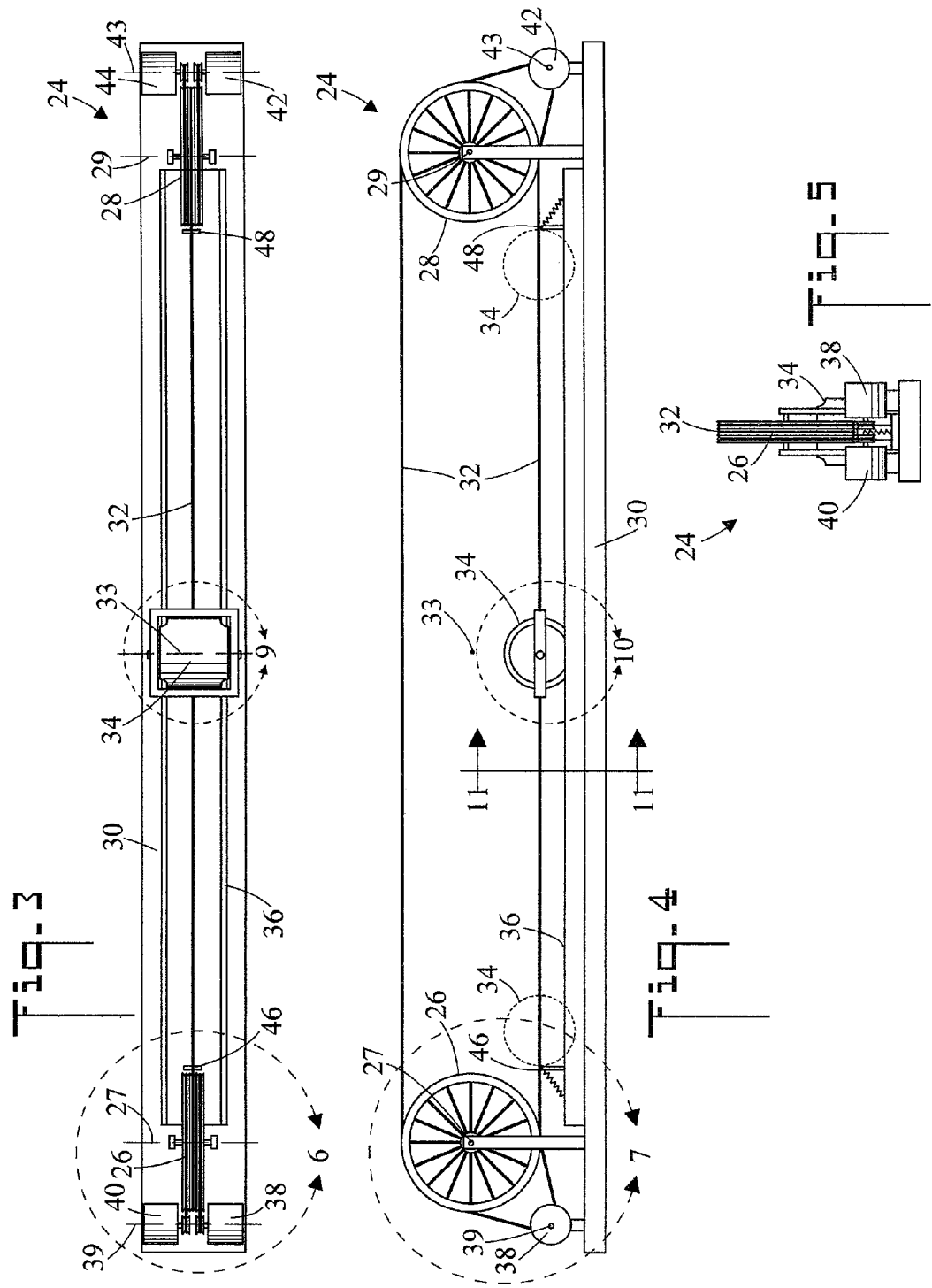

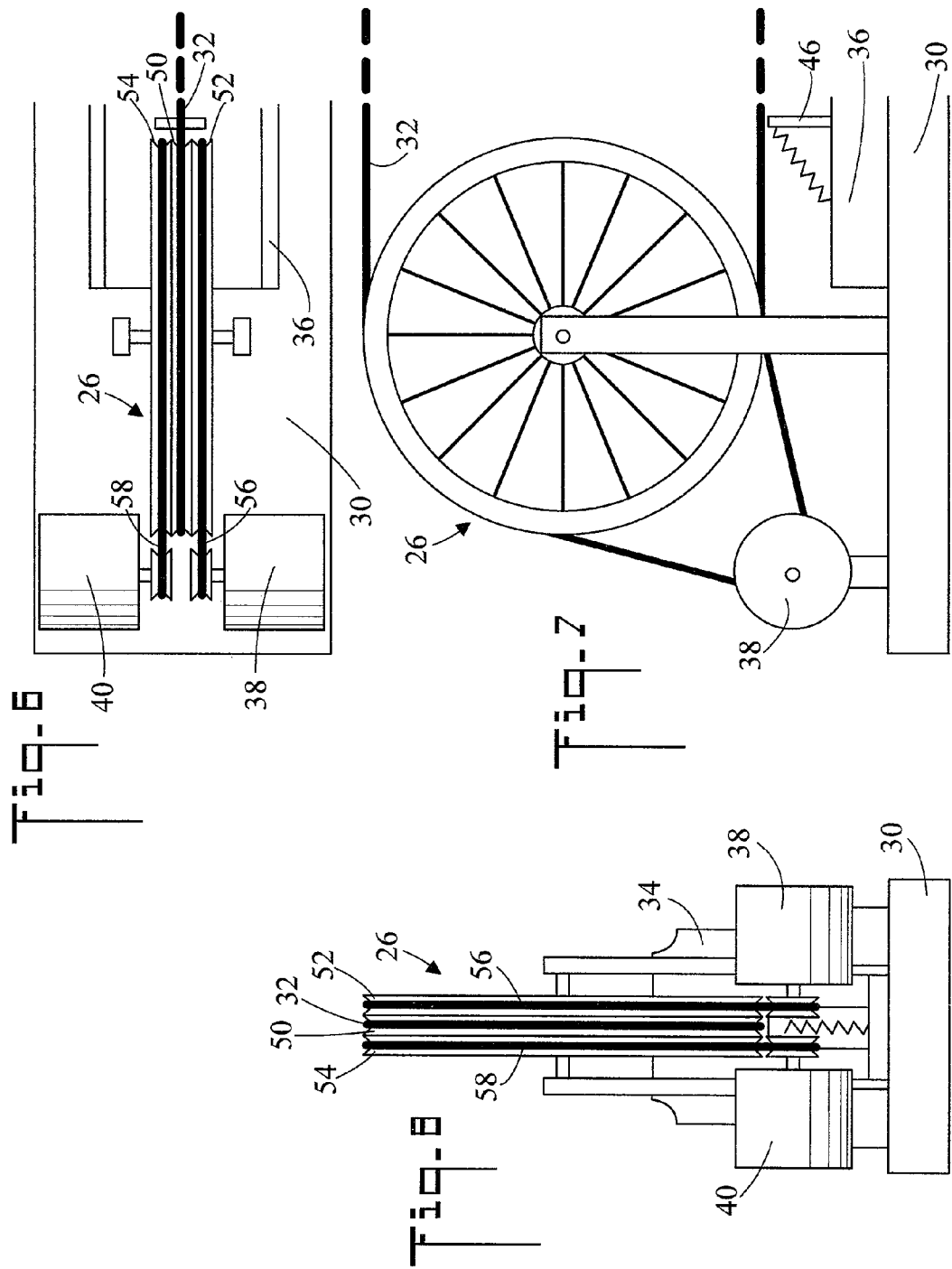

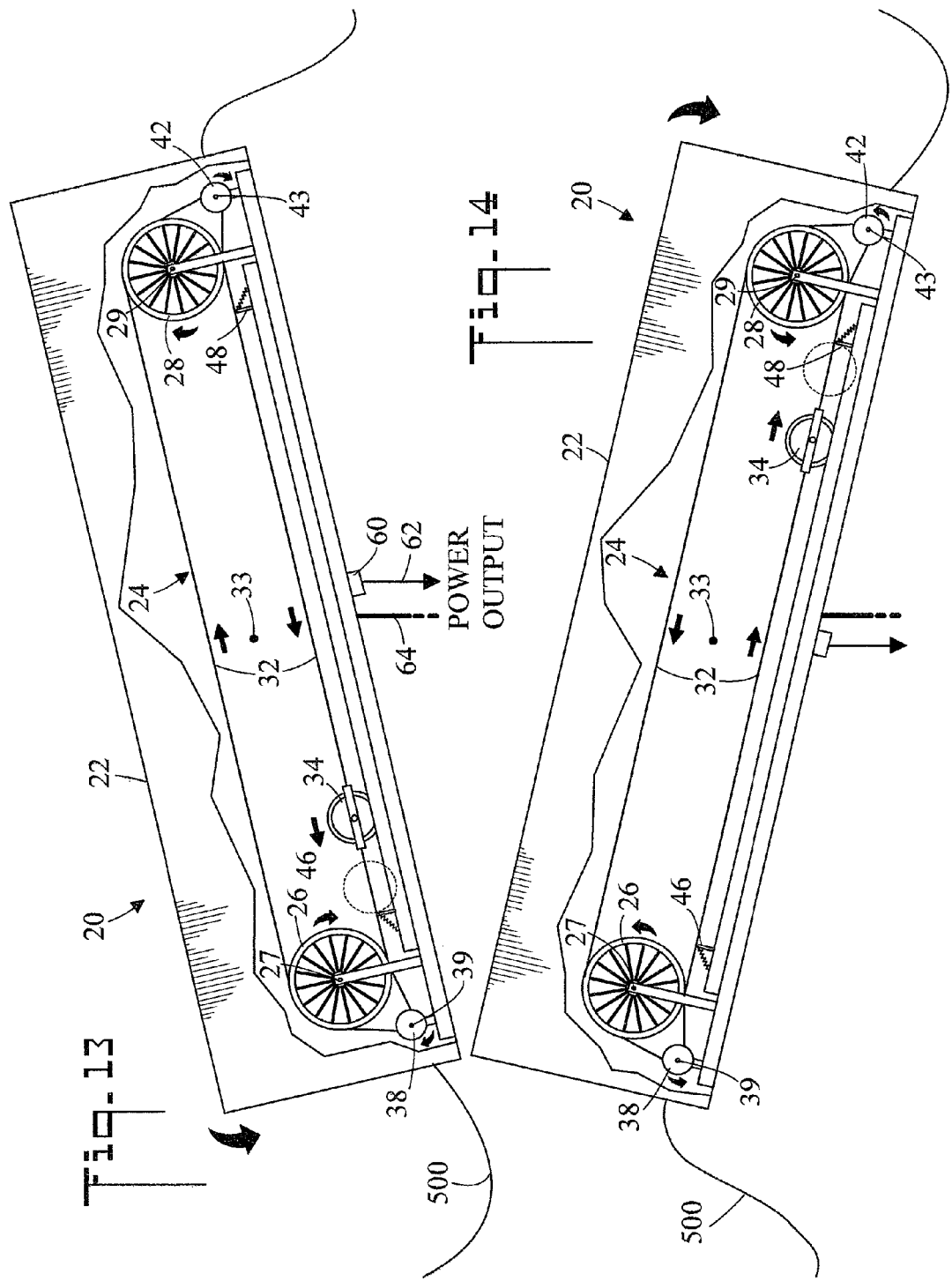

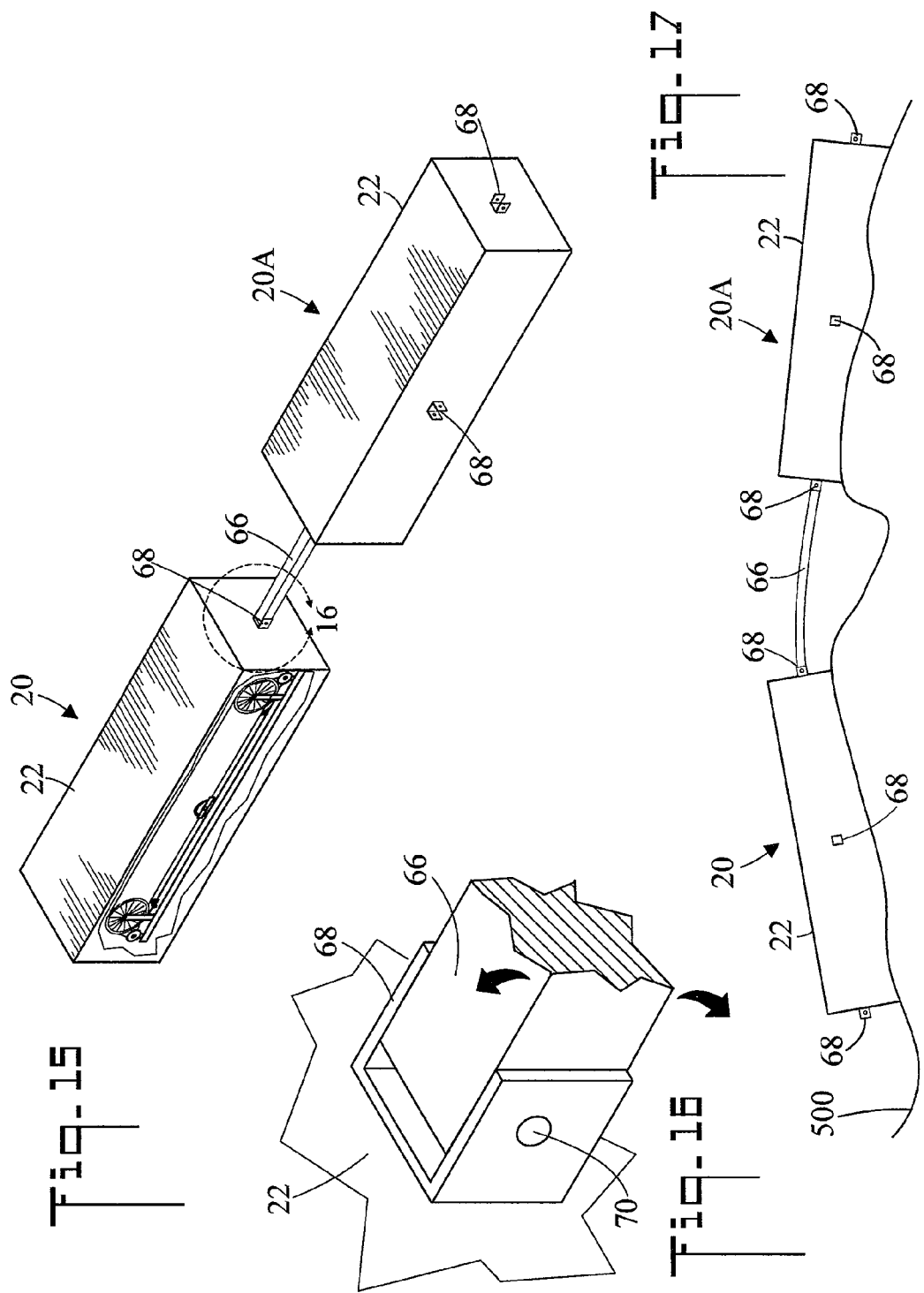

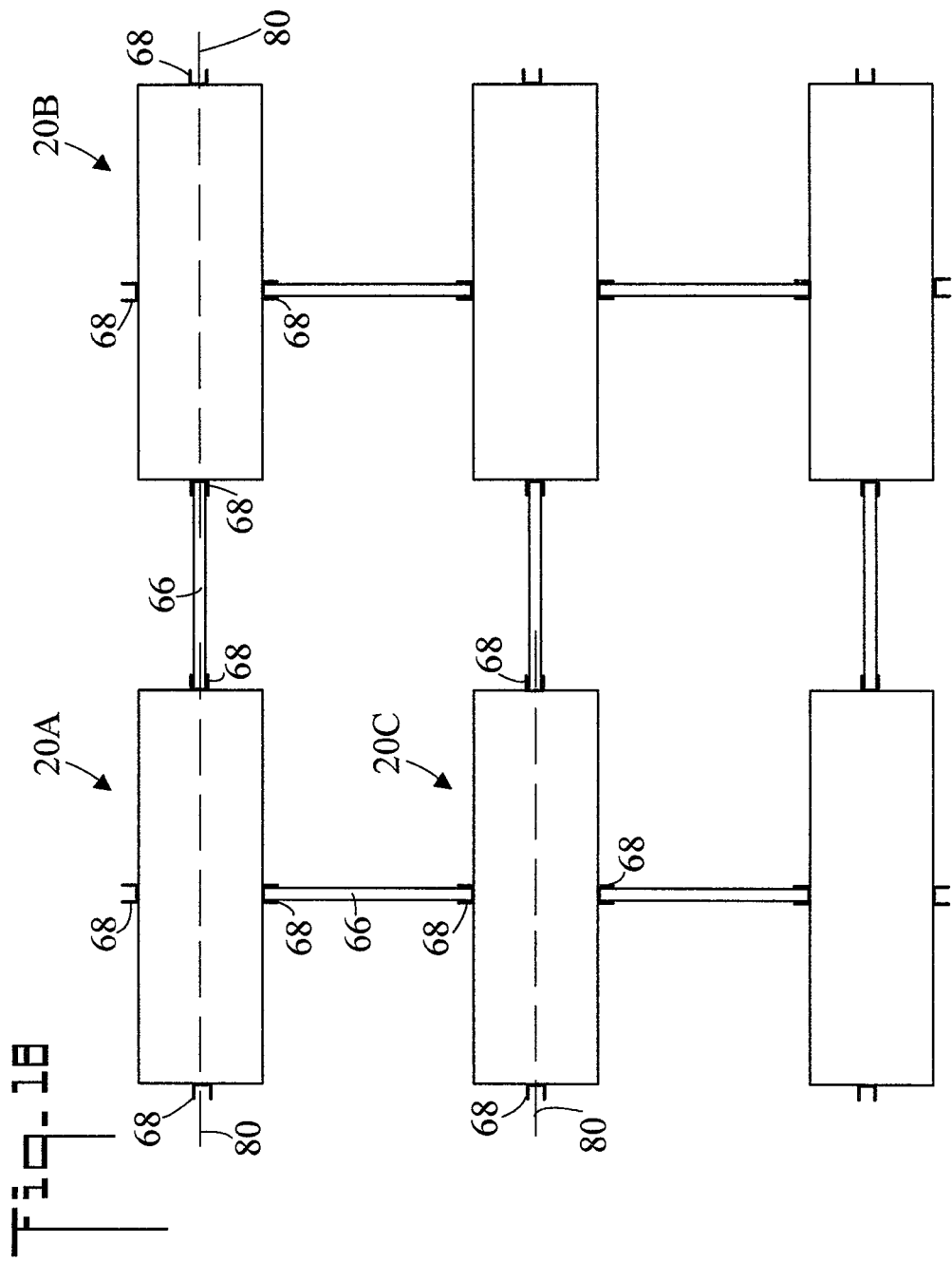

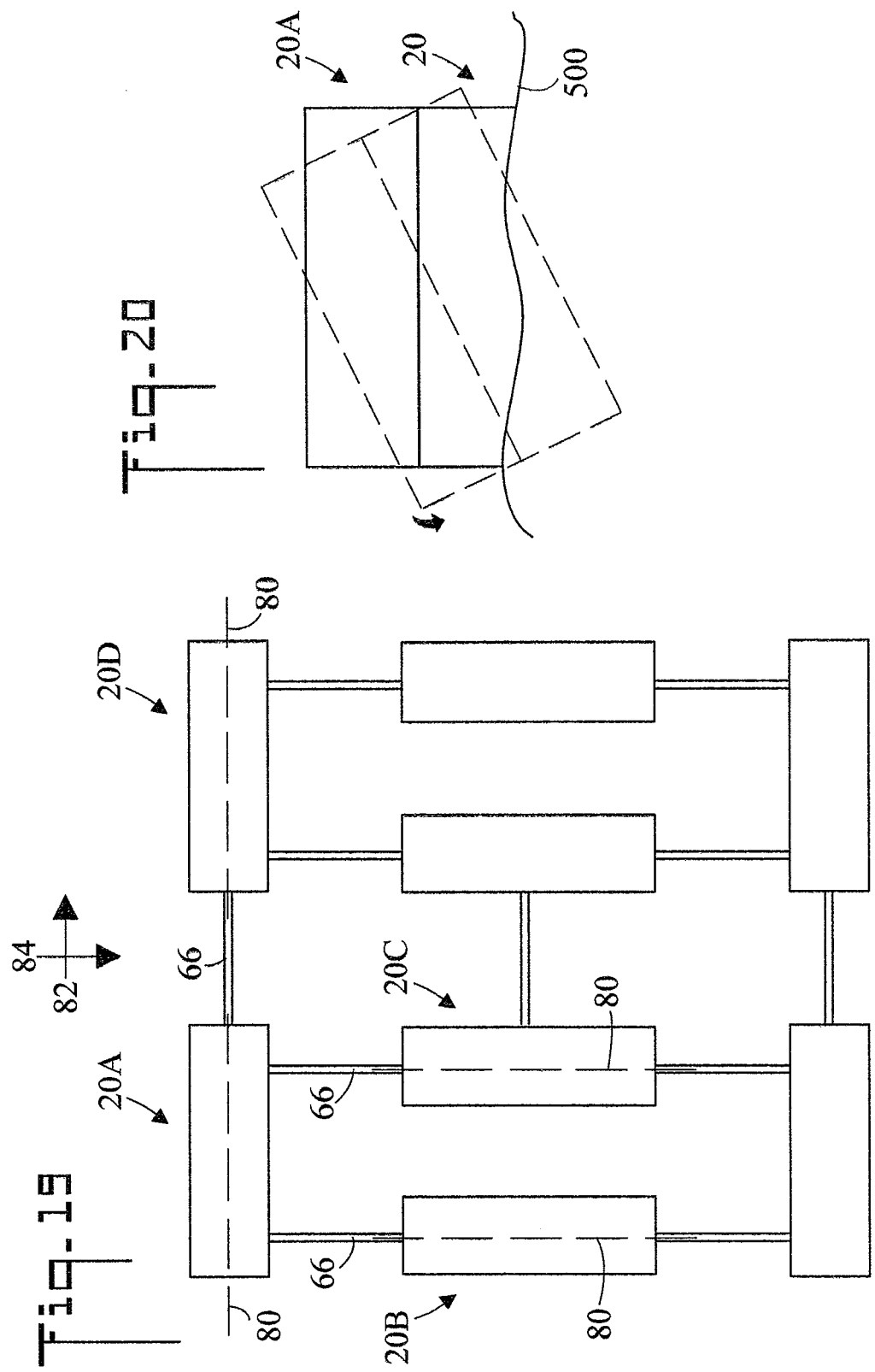

APPARATUS FOR CONVERTING WAVE MOTION ON A BODY OF WATER INTO ELECTRICAL POWER

CROSS REFERENCE TO RELATED APPLICATION

This application claims the filing benefit under 35 U.S.C. §119 of Canadian Application Number 2,829,362, filed Oct. 4, 2013, which is hereby incorporated by reference.

TECHNICAL FIELD

The present invention pertains generally to power generation, and more particularly to a fully enclosed floating power generating system which converts the kinetic energy of waves on a body of water into electrical energy.

BACKGROUND OF THE INVENTION

Systems which harness sea wave energy are known in the art. In one approach energy is generated when floating modules move up and down in response to wave action. In other systems the power generating mechanism uses the vertical motion inherent in the movement of waves to effect a corresponding displacement of a component of the generating system. Other systems utilize pendulums or the movement of fluid to generate power from wave motion. And still other systems utilize the tilting motion of a floating module to generate electrical power.

BRIEF SUMMARY OF THE INVENTION

The present invention is directed to apparatus for converting the energy of waves on a body of water into electrical power. The apparatus includes an electrical power generating system which is enclosed in a compact, sealed, waterproof floating container (module) which protects the components against the elements of water, wind, salt, ice, and floating debris. The electrical power generating system includes one or more electrical power generating units. The electrical power generating units employ a pair of spaced apart wheels having one or more rotatably connected electrical generators. The wheels are connected by a drive element which has a weight. When wave motion causes the electrical power generating unit to tilt, because of gravity the weight moves thereby turning the wheels and generator(s) and producing electrical power.

In accordance with an embodiment, apparatus for converting wave motion on a body of water into electrical power includes an electrical power generating system. The electrical power generating system includes an electrical power generating unit which is disposed within the floatable housing. The electrical power generating unit includes a first wheel and a second wheel which is spaced apart from the first wheel. The wheels are connected by a drive element to which a weight is attached. One or more generators are rotatably connected to the wheels so that when the wheels rotate the generators also rotate. When the electrical power generating system is placed in the body of water the wave motion causes the electrical power generating system to tilt so that one of the first wheel and the second wheel becomes lower than the other of the first wheel and the second wheel, the weight moving toward the lower wheel, which causes the drive element to rotate, which causes the first wheel to rotate, which causes the generator to rotate and produce electrical power.

In accordance with another embodiment, a track is disposed between the first wheel and the second wheel. The weight includes a roller which is shaped and dimensioned to roll along the track.

In accordance with another embodiment, the track has a first end disposed near the first wheel, and a second end disposed near the second wheel. A first stop is disposed at the first end of the track for preventing the roller from striking the first wheel, and a second stop is disposed at the second end of the track for preventing the roller from striking the second wheel.

In accordance with another embodiment, a plurality of generators are rotatably connected to the first wheel.

In accordance with another embodiment, at least one generator is rotatably connected to the second wheel.

In accordance with another embodiment, a second generator is rotatably connected to the first wheel. The first wheel includes a middle pulley and two end pulleys. The drive element is connected to the middle pulley. The first generator is rotatably connected to one of the end pulleys, and the second generator is rotatably connected to the other of the end pulleys.

In accordance with another embodiment, a plurality of electrical power generating units are disposed within the floatable housing.

In accordance with another embodiment, a second electrical power generating system is provided. A connector is provided for connecting the electrical power generating system to the second electrical power generating system.

In accordance with another embodiment, the connector prevents the electrical power generating system and the second electrical power generating system from both drifting apart and colliding.

In accordance with another embodiment, the connector is an elongated member.

In accordance with another embodiment, the connector is a flexible beam.

In accordance with another embodiment, the connector is removably connectable to the electrical power generating system and the second electrical power generating system.

In accordance with another embodiment, the electrical power generating system and the second electrical generating system each having a connector receiving station for connecting the connector.

In accordance with another embodiment, the connector receiving station includes a pivot axis about which the connector can rotate.

In accordance with another embodiment, the electrical power generating system and the second electrical power generating system each have a plurality of connector receiving stations.

In accordance with another embodiment, a plurality of the electrical power generating systems are connected to form an array of systems. Each of the electrical power generating systems of the array of systems has a longitudinal axis along which the power generating unit is disposed. The array of systems are arranged so that the longitudinal axis of an electrical power generating system is oriented parallel with the longitudinal axis of an adjacent electrical power generating system.

In accordance with another embodiment, the array of systems is arranged so that the longitudinal axis of an electrical power generating system is oriented perpendicular to the longitudinal axis of an adjacent electrical power generating system.

In accordance with another embodiment, a second power generating system is stacked on top of the power generating system.

Other embodiments, in addition to the embodiments enumerated above, will become apparent from the following detailed description, taken in conjunction with the accompanying drawings, which illustrate, by way of example, the principles of the apparatus.

BRIEF DESCRIPTION OF THE DRAWINGS

FIG. 1 is a top plan cutaway view of an electrical power generating system which converts wave motion on a body of water into electrical power;

FIG. 2 is a side elevation cutaway view of the system;

FIG. 3 is an enlarged top plan view of an electrical power generating unit;

FIG. 4 is a side elevation view of the electrical power generating unit:

FIG. 5 is an end elevation view of the electrical power generating unit:

FIG. 6 is an enlarged view of area 6 of FIG. 3;

FIG. 7 is an enlarged view of area 7 of FIG. 4;

FIG. 8 is an enlarged view of FIG. 5;

FIG. 13 is a reduced side elevation cutaway view of the system being tilted by wave motion;

FIG. 14 is another reduced side elevation cutaway view of the system being tilted by wave motion;

FIG. 15 is a reduced perspective view of two electrical power generating systems connected together;

FIG. 16 is an enlarged view of area 16-16 of FIG. 15;

FIG. 17 is a reduced side elevation view of the two electrical power generating systems being tilted by wave motion;

FIG. 18 is a reduced top plan view of an array of electrical power generating systems;

FIG. 19 is a reduced top plan view of another array of electrical power generating systems; and, FIG. 20 is a reduced side elevation view of two stacked electrical power generating systems.

DETAILED DESCRIPTION OF THE INVENTION

Figure 11:
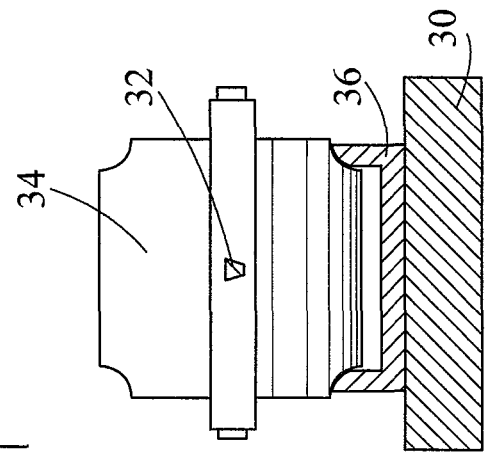
FIG. 11 is a cross sectional view along the line 11-11 of FIG. 4.
Figure 9:
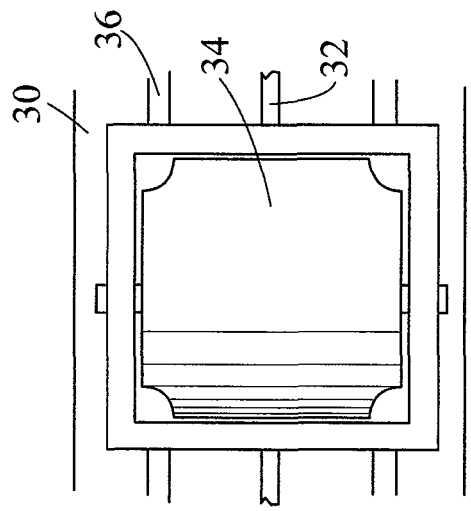
FIG. 9 is an enlarged view of area 9 of FIG. 3.
Figure 10:
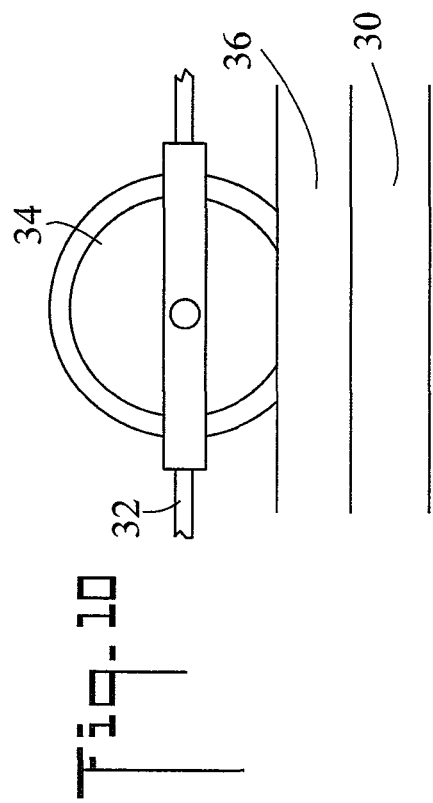
FIG. 10 is an enlarged view of area 10 of FIG. 4.

Referring initially to FIGS. 1 and 2, there is illustrated apparatus for converting wave motion on a body of water 500 to electrical power. The apparatus includes an electrical power generating system, generally designated as 20. Also referring to FIGS. 3-11, electrical power generating system 20 includes a watertight floatable housing 22 which floats on a body of water 500 such as an ocean, lake, etc. An electrical power generating unit 24 is disposed within floatable housing 22. Electrical power generating unit 24 includes a first wheel 26 which is spaced apart from a second wheel 28. In the shown embodiment, first 26 and second 28 wheels are pulleys, however other elements such as gears and sprockets could also be utilized. Also in the shown embodiment, wheels 26 and 28 are fixedly connected to a base 30 which is in turn fixedly connected to floatable housing 22. A drive element 32 rotatably connects first wheel 26 and second wheel 28. Drive element 32 is a continuous band which is looped around first wheel 26 and second wheel 28 so that as drive element 32 moves (rotates) wheels 26 and 28 rotate. In the shown embodiment drive element 32 is a belt which rotates first wheel 26 and second wheel 28 which are pulleys. It may be appreciated however that drive element 32 could also be a rope, cable, chain, etc.

A weight 34 is connected to drive element 32. In the shown embodiment, a track 36 is disposed between first wheel 26 and second wheel 28. Weight 34 includes a roller which is shaped and dimensioned to roll along track 36. As such, through the action of gravity weight 34 is free to bi-directionally move along track 36 either toward first wheel 26 or toward second wheel 28. The roller and track design minimizes stress and strain on drive element 32.

An electrical generator 38 is rotatably connected to first wheel 26 so that when first wheel 26 rotates the rotor of generator 38 also rotates. In the shown embodiment, a second generator 40 is also rotatably connected to first wheel 26, and at least one generator is connected to second wheel 28. As shown, two generators third generator 42 and fourth generator 44 are connected to second wheel 28. In an embodiment, generator 38 (and 40, 42, and 44) are alternators.

Also referring to FIGS. 13 and 14, when floatable housing 22 is placed in body of water 500 the wave motion causes electrical power generating system 20 to tilt so that one of first wheel 26 and second wheel 28 becomes lower (closer to the center of the earth) than the other of first wheel 26 and second wheel 28. In FIG. 13 the tilting has caused first wheel 26 to be lower than second wheel 28, and in FIG. 14 the tilting has caused second wheel 28 to be lower than first wheel 26. When system 20 is so tilted, because of gravity weight 34 moves toward the lower wheel which in turn causes drive element 32 to rotate (about axis 33), which in turn causes first wheel 26 to rotate (about axis 27), which in turn causes generator 38 to rotate (about axis 39) and produce electrical power (also refer to FIGS. 3 and 4). It is further noted that the tilting further causes second wheel 28 to rotate (about axis 29), second generator 40 to rotate (about axis 39) and produce electrical power, and third and fourth generators 42 and 44 respectively to rotate (about axis 43) and produce electrical power. In FIG. 13 the rotation of drive element 32, wheels 26 and 28, and generator(s) 38 (and 40), and 42 (and 44) are all clockwise, and in FIG. 14 the rotation is counterclockwise. The direction of rotation of drive element 32 is shown by the two arrows. In an embodiment, generator 38 (and 40, 42, and 44) produce electrical power in both rotational directions.

Track 36 has a first end disposed near first wheel 26, and a second end disposed near second wheel 28. A first stop 46 is disposed at the first end of track 36 for preventing roller 34 from striking first wheel 26, and a second stop 48 is disposed at the second end of track 36 for preventing roller 34 from striking second wheel 28. The maximum excursion of roller 34 is shown in dashed lines in FIGS. 4, 13 and 14.

Referring specifically to FIGS. 6 and 8, a second generator 40 is rotatably connected to first wheel 26. First wheel 26 includes a middle pulley 50 and two end pulleys 52 and 54. That is, first wheel 26 consists of three pulleys which are axially connected together (such as by welding). Drive element 32 is connected to middle pulley 50. First generator 38 is rotatably connected to one end pulley (52 as shown), and second generator 40 is rotatably connected to the other of end pulley (54 as shown). The connection of pulley 52 to first generator 38 is effected by a first generator drive element 56 (such as a belt, rope, cable, chain etc.), and the connection of pulley 54 to second generator 40 is effected by a second generator drive element 58.

Figure 12:
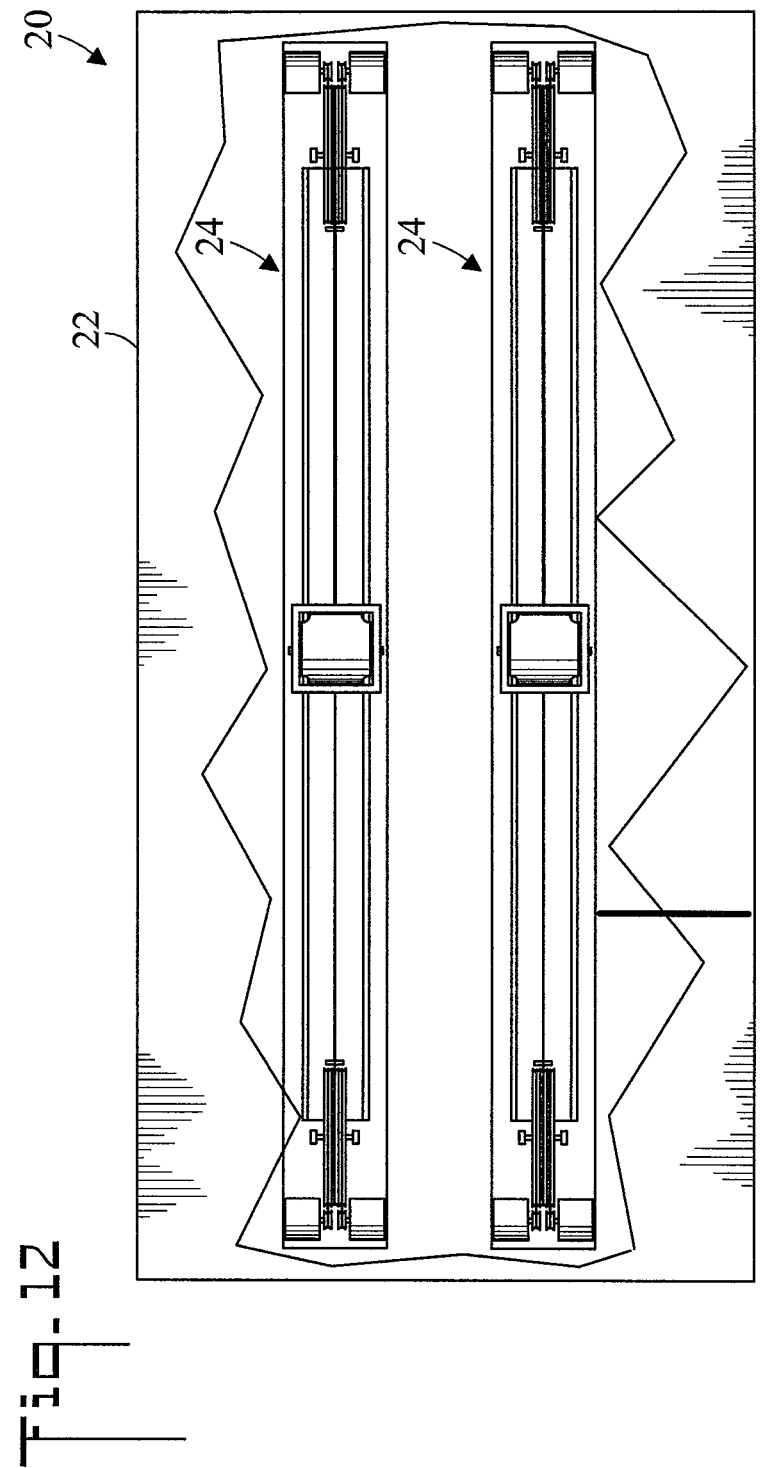
FIG. 12 is a top plan view of the system with a plurality of electrical power generating units.

FIG. 12 is a top plan view of electrical power generating system 20 with a plurality of electrical power generating units 24. It may be appreciated that other embodiments could include three or more electrical power generating units 24.

Again referring to FIGS. 13 and 14, floatable housing 22 includes a sealed output port 60 which routes the power output of power generating unit 24 through an electrical cable 62 to a remote location, typically on shore. In one embodiment the electrical cable is run along an anchor line 64 which anchors floatable housing 22 to the floor of the body of water.

FIG. 15 is a reduced perspective view of two electrical power generating systems 20 and 20A connected together, FIG. 16 is an enlarged view of area 16-16 of FIG. 15, and FIG. 17 is a reduced side elevation view of the two connected electrical power generating systems 20 and 20A being tilted by wave motion. Electrical power generating system 20 is connected to a second electrical power generating system 20A by a connector 66. Connector 66 prevents electrical power generating systems 20 and 20A from both drifting apart and colliding, and can be used to form an array of electrical power generating systems 20 (refer to FIGS. 18 and 19). In the shown embodiment, connector 66 is an elongated member such as a flexible beam made from rubber or other resiliently bendable material. In the shown embodiment, electrical power generating system 20 and electrical power generating system 20A each have a connector receiving station 68 which removably receives one end of connector 66. Connector receiving station 68 includes a pivot axis 70 about which connector 66 can rotate (in a generally vertical plane). The rotation capability coupled with the flexibility of connector 66, ensures that electrical power generating system 20 and second electrical power generating system 20A can move with respect to each other during wave motion as is shown in FIG. 17. It is noted that in the shown embodiment, connector receiving station 68 is disposed about half way between the top and bottom of floatable housings 22 and 22A.

Still referring to FIG. 15, it is also noted that electrical power generating system 20 and second electrical power generating system 20A each have a plurality of connector receiving stations 68 disposed around their perimeters. This facilitates the connection of electrical power generating systems 20 into arrays such as shown in FIGS. 18 and 19, and also permits array reconfiguration, and electrical power generating system 20 replacement in the event of failure.

FIG. 18 is a reduced top plan view of an array of electrical power generating systems 20 which are connected by connectors 66 which are connected to connector receiving stations 68. A plurality of electrical power generating systems 20 are connected to form the array of electrical power generating systems. Each electrical power generating system 20 of the array of electrical power generating systems has a longitudinal axis 80 along which power generating unit 24 is disposed (refer also to FIGS. 1 and 2). The array of electrical power generating systems is arranged so that longitudinal axis 80 of an electrical power generating system 20 is oriented parallel with the longitudinal axis of an adjacent electrical power generating system 20. For example, it is noted that the longitudinal axis 80 of electrical power generating system 20A is parallel to the longitudinal axis 80 of adjacent electrical power generating system 20B. It is further noted that the longitudinal axis 80 of electrical power generating system 20A is collinear with the longitudinal axis 80 of adjacent electrical power generating system 20C, which for the purposes of this discussion is also parallel.

FIG. 19 is a reduced top plan view of another array of electrical power generating systems. In this case, the array of electrical power generating systems is arranged so that longitudinal axis 80 of an electrical power generating system 20 is oriented perpendicular to the longitudinal axis of an adjacent electrical power generating system 20. For example, it is noted that the longitudinal axis 80 of electrical power generating system 20A is perpendicular to the longitudinal axes 80 of adjacent electrical power generating systems 20B and 20C. This perpendicular relationship ensures that electrical power will be generated for tilting wave motion in either directions 82 or 84. For wave motion in direction 82, electrical power generating systems 20A and 20D will generate the most electrical power, while for wave motion in direction 84, electrical power generating systems 20B and 20C will generate the most power.

FIG. 20 is a reduced side elevation view of two stacked electrical power generating systems. Second electrical power generating system 20A is stacked on top of electrical power generating system 20. Because of the increased height, the motion of weight 34 (refer to FIGS. 1 and 2) in second electrical power generating system 20A is amplified, and thereby more electrical power is generated. The two tilted systems are shown in dashed lines. Also, stacking permits more electrical power generating systems 20 to be placed in a given area.

The embodiments of the apparatus described herein are exemplary and numerous modifications, combinations, variations, and rearrangements can be readily envisioned to achieve an equivalent result, all of which are intended to be embraced within the scope of the appended claims. Further, nothing in the above-provided discussions of the apparatus should be construed as limiting the invention to a particular embodiment or combination of embodiments. The scope of the invention is defined by the appended claims.

I claim:

1. Apparatus for converting wave motion on a body of water into electrical power, comprising:
   an electrical power generating system including;
      a floatable housing;
      an electrical power generating unit disposed within said floatable housing, said electrical power generating unit including:
         a first wheel;
         a second wheel spaced apart from said first wheel;
         a drive element rotatably connecting said first wheel and said second wheel;
         a weight connected to said drive element;
         a first electrical generator rotatably connected to said first wheel so that when said first wheel rotates said first generator rotates;
         a second generator rotatably connected to said first wheel;
         said first wheel including a middle pulley and two end pulleys;
         said drive element connected to said middle pulley;
         said first generator rotatably connected to one of said end pulleys;
         said second generator rotatably connected to the other of said end pulleys; and,
      wherein said electrical power generating system is adapted to be placed in the body of water such that the wave motion causes said electrical power generating system to tilt so that one of said first wheel and said second wheel becomes lower than the other of said first wheel and said second wheel, said weight moving toward said lower wheel, which causes said drive element to rotate, which causes said first wheel to rotate, which causes said generators to rotate and produce electrical power.

2. Apparatus for converting wave motion on a body of water into electrical power, comprising:

an electrical power generating system including;
- a floatable housing;
- an electrical power generating unit disposed within said floatable housing, said electrical power generating unit including:
  - a first wheel;
  - a second wheel spaced apart from said first wheel;
  - a drive element rotatably connecting said first wheel and said second wheel;
  - a weight connected to said drive element;
  - an electrical generator rotatably connected to said first wheel so that when said first wheel rotates said generator rotates;
- wherein said electrical power generating system is adapted to be placed in the body of water such that the wave motion causes said electrical power generating system to tilt so that one of said first wheel and said second wheel becomes lower than the other of said first wheel and said second wheel, said weight moving toward said lower wheel, which causes said drive element to rotate, which causes said first wheel to rotate, which causes said generator to rotate and produce electrical power;

a plurality of said electrical power generating systems connected to form an array of systems;

each said electrical power generating system of said array of systems having a longitudinal axis along which said power generating unit is disposed; and, said array of systems arranged so that said longitudinal axis of a said electrical power generating system is oriented perpendicular to said longitudinal axis of an adjacent said electrical power generating system.

* * * * *